Patented Apr. 30, 1946

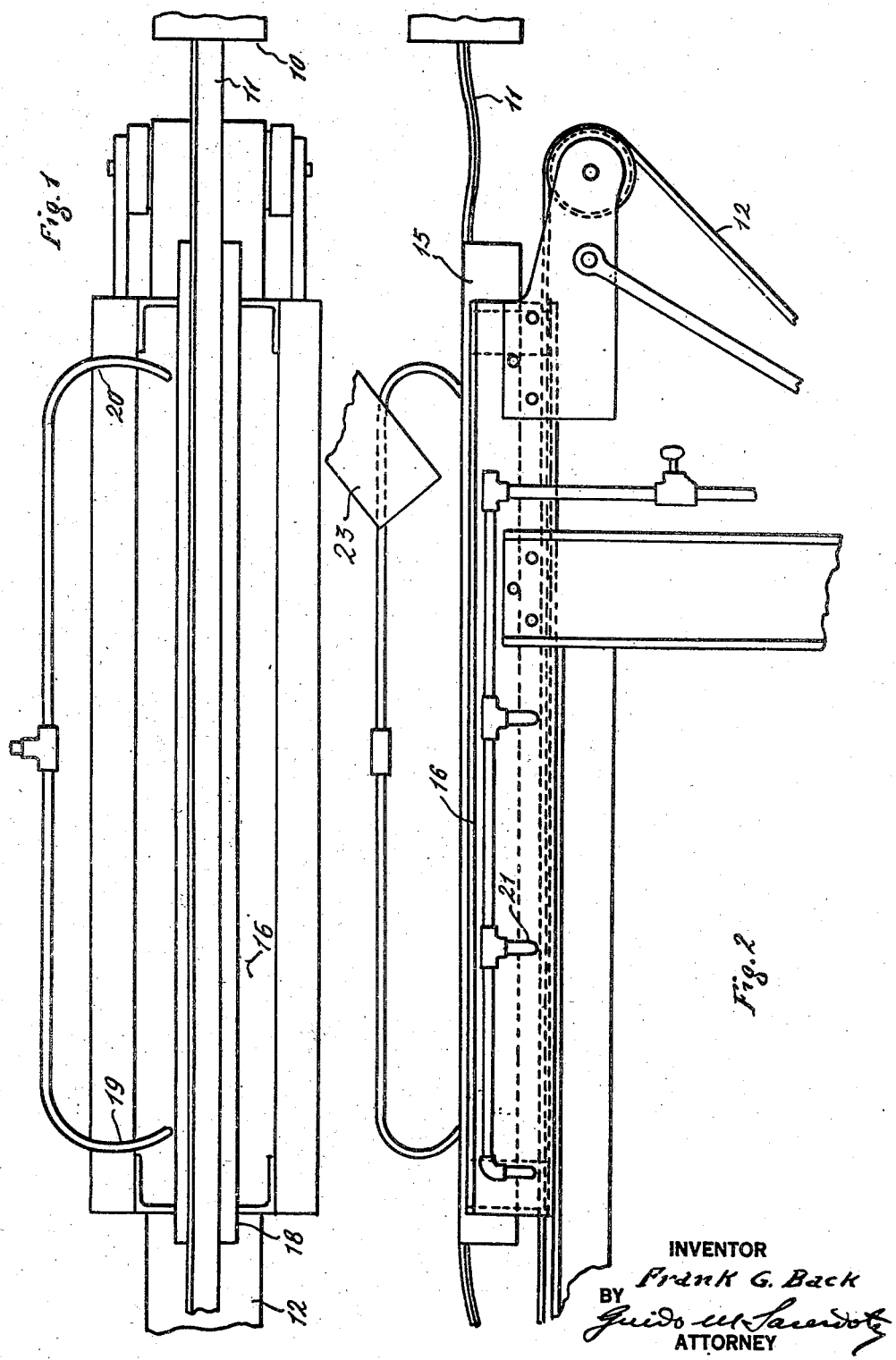

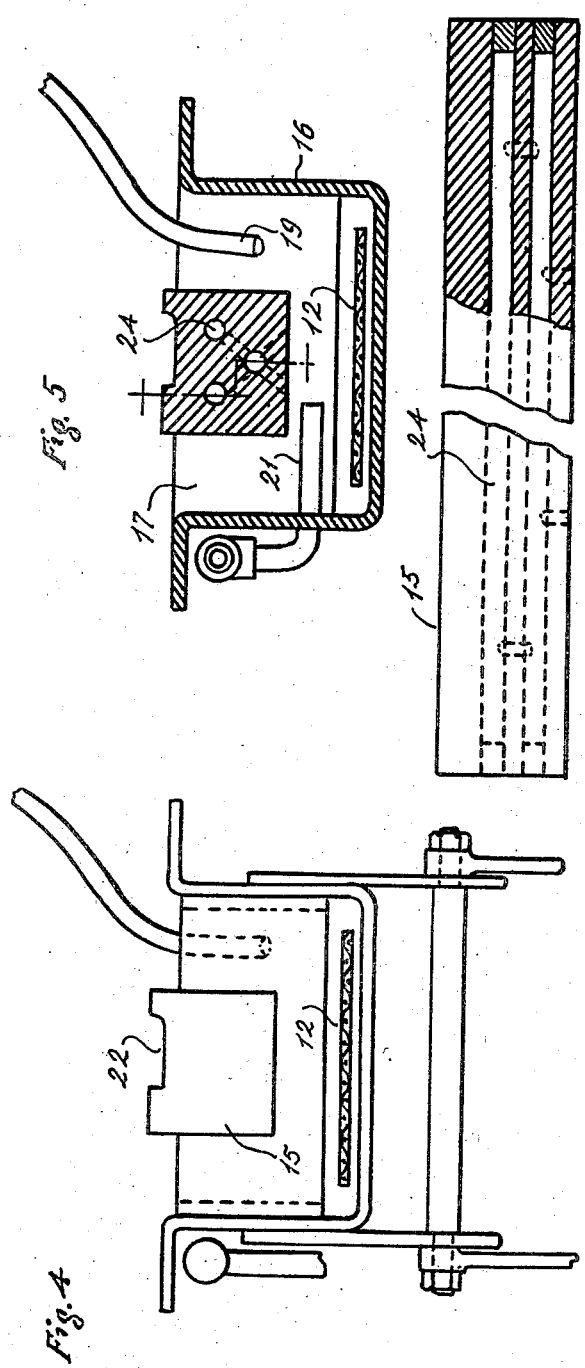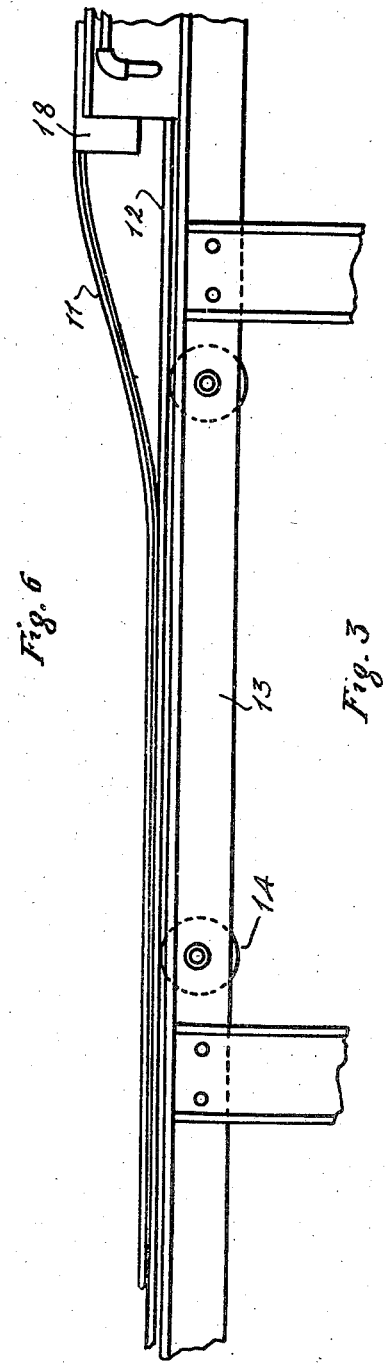

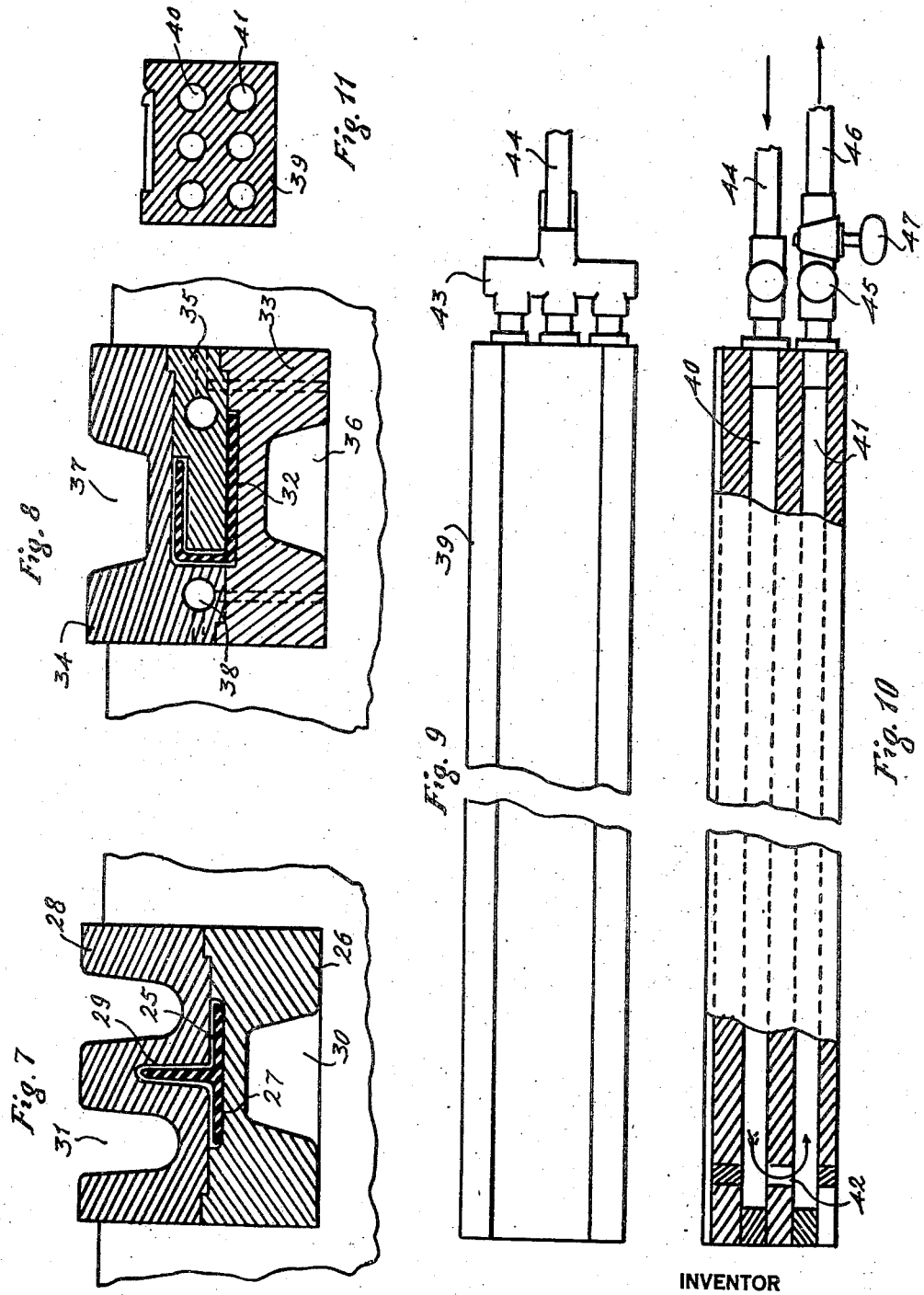

2,399,422

UNITED STATES PATENT OFFICE 2,399,422

APPARATUS FOR COOLING EXTRUDED PLASTICS

Frank G. Back, New York, N. Y.

Application August 16, 1941, Serial No. 407,158

7 Claims. (Cl. 18—12)

This invention relates to the art of extruding plastics, especially thermoplastic materials, in continuous lengths, and more particularly refers to improvements in devices for cooling moldings and other products of a kindred nature, as they issue from the die head of an extruding machine.

In continuous extrusion of thermoplastics, material is heated and forced through orifices of the proper shape called for by the cross section to be produced. Because the material hardens simply by cooling, the material can be produced rapidly, and in a finished form. Most extrusion installations have an endless conveyor belt take-off, which at the same time, with the assistance of air jets directed at intervals against the material as it is conveyed over the belt, serves also for cooling. In some cases, water is employed for removing the heat.

However, this method of cooling is not wholly satisfactory because the cooling action is unevenly applied. Particularly when running irregular sections having ribs directed at an angle to one another, such as, for instance, variations of C, U and H shapes, the proper cooling presents a complex problem. Uneven cooling will frequently result in a deformed or arched product, requiring subsequent treatment by annealing and other operations to reduce the cut lengths to a straight form.

Another objection which can be advanced against the use of a conveyor belt as the sole receiver of the material as it is delivered by the extruding machine is that that part of the surface of the extruded material which rests upon the belt is apt to lack the smoothness and finish which constitute one of the most desirable characteristics of plastic products from the standpoint of appearance and decoration.

Furthermore, when the material leaves the die head it is fused to a very soft, almost colloidal consistency; at certain points the material will stick to the belt and must be forcibly detached, with resulting deformation of the stock and consequent wastage of a certain proportion of the product rendered unfit for commercial application.

It follows that the handling and cooling of the material as it leaves the extruding machine plays a very important part in the success of the process, and that in handling certain complicated shapes especially, the results depend primarily upon careful, skilled operation and supervision.

In analyzing the conditions created by the processing methods heretofore in use, I have reached the conclusion that an energetic cooling action exerted right after the material leaves the die head and directed along all the exposed surfaces as evenly as possible, will prevent or greatly diminish distortions and bending.

I also concluded that the finish of the material could be improved, if during the initial period of cooling the material were made to run over a smooth surface to which the material would not adhere, so that the delivery would be continuous and uniform.

Working on these assumptions, I conducted numerous tests using a great variety of materials as the cooling agents, and as a result I have developed the method and apparatus forming the subjects of the present invention.

The primary object of the present invention, accordingly, is to provide a novel and improved apparatus for processing plastic material after it leaves the die head of an extruding machine, whereby the material is subjected to a cooling action reaching all of its surfaces in a fairly even manner, so that distortion and lack of uniformity in the finished product are to a great extent or totally avoided.

Another object is to provide an apparatus for delivery of extruded plastic shapes, whereby as it leaves the die head the material is pulled over a cooling track having a smooth surface, said surface being preferably of a non-oxidizing nature and having lubricating properties facilitating the easy travel of the material without interruptions or difficulties.

A further object is to provide a novel and improved take-off device for a plastic extrusion press, comprising a stationary cooling track or bar immediately adjacent the die head, and a belt conveyor pulling the extruded shape over or through said track or bar for an initial cooling of its surfaces before the material is taken up and carried away by the conveyor itself during the completion of the cooling period.

A still further object is to provide, in a device of the character specified, a novel and improved type of cooling track or bar, insuring a good distribution of the cooling action upon the various surfaces of an extruded shape, so as to lessen or correct the tendency of the material to become distorted due to uneven cooling, and so as to insure surfaces perfectly smooth, free from defects and irregularities.

Other objects and advantages of the present invention will more fully appear as the description proceeds and will be set forth and claimed in the appended claims.

My invention is illustrated by way of example in the accompanying drawings, in which:

Fig. 1 is a fragmentary plan view of a take-off device for an extrusion press, embodying my invention;

Fig. 2 is a fragmentary side view in elevation thereof;

Fig. 3 is a fragmentary side view in elevation of part of the take-off device in continuation of the end thereof shown in Fig. 2;

Fig. 4 is an end view in elevation, in an enlarged scale, of the cooling bar assembly shown in Figs. 1 and 2;

Fig. 5 is a cross sectional view in elevation of the same;

Fig. 6 is a longitudinal side view in elevation, partly sectioned, of the cooling bar shown in Fig. 5;

Fig. 7 is a cross section view of a cooling bar for use in connection with an extruded shape having a T-section;

Fig. 8 is a similar view of a cooling bar for an extruded shape having a variation of a C-section;

Fig. 9 is a fragmentary plan view of a cooling bar adapted to be directly connected to a source of supply of a cooling fluid;

Fig. 10 is a fragmentary side view in elevation, partly sectioned, of the same; and Fig. 11 is a vertical cross section thereof.

Referring to Figs. 1 to 6, 10 designates the die head of an extruding machine from which the plastic molding 11 issues in continuous succession. The material is carried away by a belt conveyor 12, travelling along a long horizontal supporting structure 13, including a number of rollers 14, rotatably mounted at spaced intervals on said structure (see Fig. 3).

In conventional types of take-off devices for extruding machines, the material issuing from the die head is delivered directly onto the belt conveyor, which carries it away, it being understood that the speed of the conveyor belt is adjustable to equal the speed of delivery of the material from the die head, which speed of delivery is also adjustable.

According to my invention the material issuing from the die head is delivered onto a stationary cooling track or bar 15, which is supported directly above the conveyor belt within an elongated trough 16, forming an open-top chamber providing an air space 17 all around the bar.

At the start of the operation, as the material issues from the die head, it is advanced along the cooling track or bar until it reaches the outer end 18 thereof, and is then caused to slope towards and finally lay upon the belt, as shown in Fig. 3, to be thereafter carried away by the belt in a continuous manner.

The cooling track or bar is formed of material having good heat conducting properties, and the air chamber around the bar is supplied with air under pressure in some convenient manner, for instance, by means of nozzles 19, 20, and nozzles such as 21, shown in Figs. 2 and 5.

All the surfaces of the cooling member being exposed, they provide a good heat radiation which is intensified by the currents of air under pressure which carry the heat away, so that the surface or surfaces of the extruded shape which are in direct contact with the cooling bar are much more effectively cooled than if the extruded shape were cause to lay directly upon the conveyor belt.

The cooling track or bar shown is designed for use in connection with an extruded shape having a substantially flat section, the top of said bar being provided with a longitudinal groove 22 adapted to receive the extruded material, which will lie upon the bottom of said groove and will have its upper surface exposed to the air.

The upper surface can be cooled by directing a stream of cold air against it, said air issuing from one or more outlets 23, forming part of an air supply system.

It is to be understood that the air supply lines will be provided with suitable regulating devices so as to equalize as far as possible the cooling action exerted upon the surfaces of the material and thus avoid uneven cooling which is a fruitful source of distortions and arching. The result is to a great extent dependent upon the physical characteristics of the material employed for the cooling track or bar and the manner in which the dispersal of heat is allowed to take place.

Thus, the material should desirably be a good conductor of heat and should not be subject to easy oxidation, so as to preserve a continuously smooth surface upon which the plastic material will not stick. I have found that if, besides being smooth, the surface of cooling track or bar is possessed of lubricating properties, the plastic material will travel along it with the greatest ease, practically without friction and without evincing any tendency to adhere to the surface. Furthermore, I have found that the dispersal of heat is greatly aided if the material is more or less porous, giving the air a chance to flow through all the minute passages within its mass.

During the course of my experiments I have found that metals generally are not very satisfactory for use in a cooling track or bar because the plastic material has a tendency to stick to metallic surfaces; however, if proper lubrication is maintained the passage of the extruded material over the cooling track or bar is facilitated but, here again, the use of a lubricant may be objectionable because of its adherence to the surface of the plastic material which would, therefore, be unclean.

Among all the materials tested, I have found those giving best results are graphite and graphite materials generally, pressed materials having a coal or petroleum residue or lamp black base, and other materials generally having a porous structure and a certain degree of lubricating properties. Graphite especially has a good heat conductivity, a fair degree of porosity, and is greasy to the touch. These properties, together with the fact that it is easy to machine, render graphite an ideal material for producing a cooling bar or track best adapted for carrying out the method of cooling forming one of the subjects of the present invention, although this does not exclude the possibility of using other materials. By the expression "graphite materials" are meant all those compositions in which graphite is mixed with a binder, with or without the addition of other substances, such as, for instance, mixtures of morphous carbon, graphite and a binder such as a resin, graphite clay and a mineral or vegetable oil, graphite lamp black oils and resins, graphite resin and pigments, calcined carbon and graphite, etc.

As Figs. 5 and 6 clearly show, the cooling bar can be provided with longitudinal passages 24 through which the cooling air may flow and intensify the dispersal of heat.

When the extruded material is in the form of a substantially flat ribbon, an open track, such as described and shown, is entirely satisfactory, because of the facility with which the air supply can be regulated at the various points. In the case of complicated shapes, however, it is better to build the cooling bar in sections, entirely enclosing the extruded material, in order to insure greater uniformity in the cooling action.

Thus, in Fig. 7, I illustrate a cooling bar for an extruded shape 25, having a T-section, in which the plastic material is caused to pass through a passage also having a T-section. The cooling bar is shown composed of a lower section 26 having a longitudinal groove 27, adapted to receive the flat head of the T-shape, and an upper section 28, having a longitudinal narrow and deep groove 29, completing a T-shaped longitudinal chamber with groove 27, through which the material is caused to pass.

Also in this case, the cooling action may be enhanced by providing air passages or longitudinal recesses, such as shown at 30, 31, in proximity of the surfaces to be cooled.

In Fig. 8 I show another cooling bar especially designed for an extruded shape 32 in the form of a C, having one leg shorter than the other.

In this case the cooling bar is formed of a lower section 33, an upper section 34, and an intermediate section 35 projecting between the two legs of the C, all of these sections being provided with suitable longitudinal air recesses, such as shown at 36, 37, and air ducts such as shown at 38.

It is also possible, and in some cases desirable, to directly connect the longitudinal passages of the cooling track or bar with a source of cooling fluid supply, with the understanding that if the material out of which the bar is made is porous, the fluid used should preferably be air, whereas in the case of a non-porous material the fluid could be water.

In Figs. 9 to 11, I show by way of example, a cooling bar 39 provided with three sets of fluid passages, each comprising a delivery passage 40 and a return passage 41 connected thereto at 42. The three delivery passages are connected by a manifold 43 to a supply line 44 and the return passages are connected by a manifold 45 to a discharge line 46, said manifold 45 being provided with a control valve 47.

It is obvious that numerous variations can be suggested in the design and construction of the cooling bars, according to the section of the plastic material to be treated. It is well known that extruded shapes are made in an almost endless variety of sections, and the more complicated the section the more advantageous the method herein advocated will be found to be.

The reason that this is so is that complicated and irregular shapes having longitudinal recesses are those that ordinarily present the greatest difficulties on account of the fundamental fact that lack of uniformity in the cooling action will produce distortions in the material which are difficult and expensive to correct.

The invention can, therefore, be applied in ways different from those shown without departing from the inventive idea. The drawings should, therefore, be understood as being intended for illustrative purposes only and not in a limiting sense.

I, accordingly reserve the right to carry my invention into practice in all those ways and manner which may enter, fairly, into the scope of the appended claims.

I claim:

1. A device for use in conjunction with an extruding machine for cooling fused plastic material after it is discharged in a continuous length from an extruding machine, comprising an elongated cooling bar located beyond the point of discharge for engaging and cooling the finished material discharged from the extruding machine, said bar having ducts through which a fluid can pass, means for advancing the material as it is discharged, along said bar, and means for directing a cooling fluid against the surfaces of said bar.

2. A device for use in conjunction with an extruding machine for cooling fused plastic material after it is discharged in a continuous length from an extruding machine, comprising, in combination, an elongated cooling bar located adjacent the point of discharge for engaging and cooling the material discharged from the extruding machine, said bar having ducts through which a fluid can pass, a belt conveyor running under and beyond said bar, for advancing the material as it is discharged, along said bar and to a point of delivery, and means for directing a cooling fluid against the surface of said bar.

3. In a device of the character described, a cooling bar, separate from but adapted to be used in conjunction with an extruding machine, made out of carbonaceous material, said cooling bar being made in sections together forming a conduit for fused plastic material discharged from the extruding machine, the cross-sectional outline of said conduit closely following the cross sectional outline of the extruded material.

4. In a device of the character described, a cooling bar, separate from but adapted to be used in conjunction with an extruding machine, made out of graphitic material, said cooling bar being made in sections together forming a conduit for fused plastic material discharged from the extruding machine, the cross-sectional outline of said conduit closely following the cross sectional outline of the extruded material.

5. In a device separate from but adapted to be used in conjunction with a machine for extruding synthetic resin compounds in a continuous length, the combination of a support, an elongated cooling bar made out of graphitic material mounted on said support adjacent the point of discharge of said material, means for advancing the material as it is discharged, along said bar, and means for cooling said bar and such surfaces of the material, if any, as may remain exposed to the surrounding air.

6. In a device apart from but adapted to be used in conjunction with a machine for extruding synthetic resin compounds in continuous lengths, the combination of a cooling bar made out of graphite, said cooling bar being made in sections together forming a passage for the fused plastic material discharged from said extruding machine, the outline of said passage closely following the cross sectional outline of the extruded material.

7. A device of the class described, separate from but adapted to be used in conjunction with a machine for extruding a continuous length of molded synthetic resin, in combination, an elongated cooling bar adjacent the point of discharge for engaging and cooling the material discharged from the extruding machine, a belt conveyor running under and beyond said bar, for advancing the material along said bar and to a point of delivery, and means for cooling said bar.

FRANK G. BACK.